(12) United States Patent
Baggett

(10) Patent No.: US 6,437,458 B1
(45) Date of Patent: Aug. 20, 2002

(54) ENGINE CONTROL CIRCUIT FOR A LAWN TRACTOR

(75) Inventor: Thomas D. Baggett, Antioch, TN (US)

(73) Assignee: Murray, Inc., Brentwood, TN (US)

( * ) Notice: Subject to any disclaimer, the term of this patent is extended or adjusted under 35 U.S.C. 154(b) by 102 days.

(21) Appl. No.: 09/633,117

(22) Filed: Aug. 4, 2000

(51) Int. Cl.⁷ ............................................... H02G 3/00
(52) U.S. Cl. ........................ 307/9.1; 307/10.6; 307/116
(58) Field of Search ................................. 307/9.1, 10.6, 307/116; 318/282; 180/274, 273

(56) References Cited

U.S. PATENT DOCUMENTS 5,994,857 A * 11/1999 Peterson et al. ............ 318/282
6,316,891 B1 * 11/2001 Hough ....................... 318/282

* cited by examiner

Primary Examiner—Brian Sircus
Assistant Examiner—Robert L DeBeradinis
(74) Attorney, Agent, or Firm—Kevin E. Joyce

(57) ABSTRACT

An engine control circuit for a lawn tractor having a magneto-operated engine. The circuit includes a four-position switch. When in the first position, the engine is stopped. The engine is started in the fourth position. In the third position, the tractor's power take-off can be used only during forward movement of the tractor. When the operator selects the second switch position, the power take-off can be used regardless of the direction of movement of the tractor. An additional switch is included in the circuit to isolate the tractor drive from a reverse selection arrangement.

8 Claims, 1 Drawing Sheet

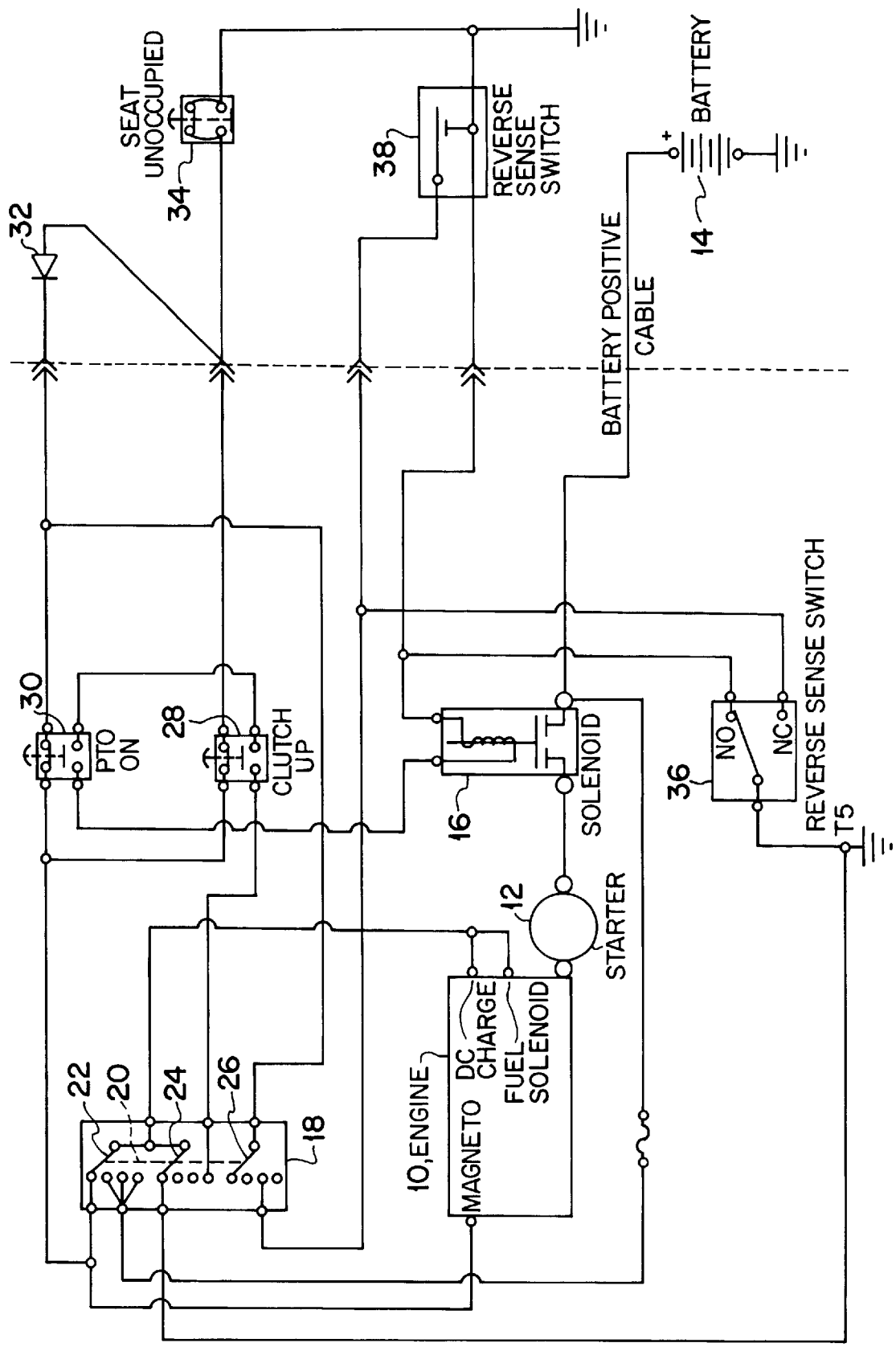

ENGINE CONTROL CIRCUIT FOR A LAWN TRACTOR

BACKGROUND OF THE INVENTION

1. Field of the Invention

The present invention relates to an electrical control circuit for use with a rider-type lawn tractor to allow the operator to use the tractor's power take-off regardless of the direction of movement of the tractor.

2. Prior Art

Lawn tractors typically are used for lawn mowing purposes and are provided with a power take-off which, when the tractor's engine is running, can be actuated to operate the mower. Once actuated, the mower is capable of operating regardless of the direction of movement of the tractor.

It has been recognized that it may be desirable to provide an arrangement whereby the operator of the tractor can selectively control the tractor's operation between modes which permit mowing regardless of whether the tractor moves in forward or reverse directions, and which prevent mowing when moving in a reverse direction by stopping the tractor's engine. Examples are described in U.S. Pat. No. 5,314,038, assigned to Deere & Co., and are incorporated in tractors marketed by the Toro Company utilizing its Key Choice™ system which permits an operator to selectively actuate separate switches to permit the power take-off to operate when the tractor is in reverse or to prevent such operation.

SUMMARY OF INVENTION

The present invention provides an improved arrangement for permitting the operator of a lawn tractor to select power take-off operation which is independent of the direction of the tractor's movement, or the prevention of power take-off actuation when the tractor moves in the reverse direction.

The foregoing results are achieved by a single multi-position key-operated switch which is associated with an engine control circuit. The key is operable between four positions: an engine-off position; a starting position; a position in which the power take-off can be enabled regardless of the direction of movement of the tractor; and a position in which the tractor's engine is turned off when actuation of the power take-off occurs with the tractor in reverse. Additionally, the engine control circuit includes an operator presence switch and switches respectively associated with the power take-off and the tractor's clutch. The operator presence switch will cause the engine to shut down if either the power take-off or the clutch is engaged with the seat unoccupied. A diode also is employed in the circuit to isolate the clutch switch from the reverse selection arrangement. This allows the tractor to be operated in reverse independently of the reverse selection arrangement as long as the power take-off is not engaged.

BRIEF DESCRIPTION OF THE DRAWING

The invention will be described in greater detail with respect to the accompanying drawing which illustrates in block diagram and schematic form a control circuit according to the invention.

DETAILED DESCRIPTION OF A PREFERRED EMBODIMENT OF THE INVENTION

Referring to the drawing, a tractor engine 10 is illustrated. The engine is a conventional magneto-fired type customarily used in applications such as lawn tractors. A starter 12 is associated with engine 10 which is actuated by a battery 14 when a solenoid 16 is energized. The magneto of engine 10 is connected to a key-operated 4-position switch 18 having a ganged movable contact arrangement 20 comprising contacts 22, 24, and 26, each being simultaneously movable between respective ones of an array of fixed contacts, four in number. As illustrated, from top to bottom, the fixed contacts of each array represent switch positions #1 to #4. The magneto is connected to fixed contact #1 associated with movable contact 22.

The magneto of engine 10 also is connected to one side of a first pair of fixed contacts of each of a clutch switch 28 and a power take-off switch 30. The movable contacts of these switches are illustrated in the positions where the clutch of the tractor is not depressed ("clutch up" so as to be engaged) and the power take-off is engaged ("PTO on"). The opposite sides of the first pair of contacts of switches 28 and 30 are connected to opposite sides of a diode 32. The diode is reversibly connected within the circuit. This is because certain conventional engines operate with positive magneto firing pulses, while others operate with negative firing pulses. The reversibility of the diode 32 permits the present circuit to be used with either type of magneto firing simply by disconnecting the diode from a wiring harness and reversing it as the magneto firing pulse polarity dictates. Of course, if the polarity of the magneto firing pulses with which the present engine circuit will be used is known, the diode can be non-reversibly connected within the circuit.

The fixed contact of switch 28 which is connected to one side of diode 32 also is connected to a fixed contact of an operator presence detector switch in the form of seat switch 34. Another fixed contact of switch 34 is connected to ground. The movable contact of switch 34 is illustrated in its position occurring when the operator is not seated on the tractor ("seat unoccupied"). In that position, switch 34 is closed whereby the magneto of engine 10 is connected to ground via switches 28 and 34 when the latter two switches are in the positions illustrated. When the tractor seat is occupied, switch 34 opens to break the circuit connection just described between the magneto and ground. Another path between ground and the magneto through seat switch 34 will be discussed during the description of operation of the invention.

The second pair of fixed contacts of switches 28 and 30 are connected in series between the position #4 fixed contact associated with movable contact 24 and one end of a coil within solenoid 16. The opposite end of the coil is grounded.

The position #3 fixed contact associated with movable contact 26 is connected to switches which sense whether the operator has selected that the tractor move in a reverse direction. In the illustrated embodiment, two such reverse sensing switches are shown—switch 36, which is used when the tractor has a hydrostatic drive, and switch 38, which is used when the direction of tractor movement is gear controlled. It will be understood, however, that only one reverse sensing switch is required depending on the type of direction control employed by the tractor with which the invention is used. The switches 36 and 38 are shown in the open positions which exist when the tractor is not in reverse. However, when the tractor is placed in reverse, the reverse sense switch used is closed to connect the position #3 fixed contact associated with movable contact 26 to ground.

The movable contact 26 is connected to the opposite side of diode 32 from that to which switch 28 is joined.

Battery 14 is connected to one of the fixed contacts of solenoid 16 and to the positions #2–#4 fixed contacts associated with movable contact 22. The other fixed contact of solenoid 16 is joined to starter 12.

The final connection requiring explanation is that the #1 fixed contact associated with movable contact 24 is connected to ground.

In the arrangement illustrated, the engine 10 is deemed to be one having negative magneto firing pulses.

The operation control circuit just detailed now will be described.

As indicated previously, with the tractor seat unoccupied, switch 34 is closed whereby a ground connection is established to the magneto of engine 10 via switches 34 and 28, provided the clutch is not depressed (i.e., the clutch being engaged). This prevents the engine from being started. However, when the seat is occupied and the clutch of the tractor is depressed (i.e., disengaged), the magneto is disconnected from ground, and the engine can be started provided the power take-off switch 30 is disengaged.

An additional circuit for grounding the magneto to prevent engine start exists when the tractor seat is unoccupied. This circuit extends from the magneto through switch 30, diode 32 and switch 34, if the power take-off switch 30 is engaged.

When the operator turns the key (not shown) whereby the ganged movable contact arrangement 20 engages the position #4 fixed contacts of switch 18, the battery 14 is connected to the dc charge and fuel solenoid portions of engine 10 via movable contact 22 and to the solenoid 16 via movable contact 24 and closed switches 28 and 30 (i.e., both the clutch and the power take-off being disengaged) to thereby energize the solenoid and close the switch contacts contained therein. This establishes a circuit from battery 14 to starter 12 whereby the engine is started.

Switch 18 is spring-loaded such that when the operator releases the key, the ganged contact arrangement 20 moves to a position at which the movable contacts of switch 18 engage their respective position #3 fixed contacts. Power from battery 14 continues to be applied to the dc charge and fuel solenoid portions of engine 10 via contact 22 when the connection between the battery and solenoid 16 is interrupted. Accordingly, the engine will continue to run.

With the contacts 20 of switch 18 in position #3, the tractor can be operated in forward and reverse directions so long as the power take-off is not engaged at the same time the tractor is in reverse. If the tractor is in reverse and the power take-off is engaged, whichever reverse sense switch is being used (switch 36 or switch 38) is closed whereby a connection from ground is established to the magneto via the reverse sense switch, the position #3 fixed contact associated with movable contact 26, contact 26, and the upper contacts of PTO switch 30. This grounding of the magneto shuts off the engine. However, so long as the tractor is not in reverse, the reverse sense switch remains open. Therefore, the magneto is not grounded. This permits the PTO switch to be engaged during neutral or forward movement of the tractor. If the reverse switch is closed with the PTO switch 30 disengaged, the diode 32 is back-biased whereby the magneto is not grounded, and the tractor can move in the reverse direction without the engine being shut-off. Thus, the diode isolates the tractor drive from the reverse selection arrangement allowing the tractor to be operated in reverse, independently of reverse selection, so long as the power take-off is not engaged.

Should the operator desire to have the tractor operate with the PTO engaged and the tractor moving in reverse, the key must be turned to position the movable contact arrangement 20 at position #2. The resultant displacement of movable contact 26 from its associated position #3 fixed contact interrupts the circuit to the reverse sense switch. Battery power continues to be applied to the engine via movable contact 22 of switch 18 whereby engine 10 remains operative, and no path to ground from the magneto is established unless the operator leaves the tractor seat. If this occurs, a ground circuit is established by: (1) a path from ground to the magneto via seat switch 34 and engaged clutch switch 28; or (2) a path from ground to the magneto through seat switch 34, forwardly biased diode 32 and engaged PTO switch 30.

When the operator desires to shut the engine off, the key is turned to displace the movable contact 20 to position #1 at which a ground connection to the magneto is established via movable contacts 24 and 22 to shut down engine 10.

While a diode 32 has been disclosed as a type of switch employed in a preferred embodiment of the invention, it will be understood that the diode could be replaced by another type of switch, for example, a double pole switch.

What is claimed is:

1. An engine control circuit for a lawn tractor comprising: a magneto-operated engine;

a key-actuated multi-position switch having first, second, third and fourth positions;

a first circuit for connecting said magneto to ground when said switch is in the first position thereby preventing said engine from operating;

a second circuit for connecting said engine to a battery when said switch is in the fourth position thereby causing said engine to operate;

a third circuit for connecting said magneto to ground when said switch is in the third position to stop said engine from operating, said third circuit including a reverse sensing switch and a power take-off switch, the connection to ground being completed when said power take-off switch is closed and said reverse sensing switch detects that said tractor is intended to move in a reverse direction;

a fourth circuit for isolating said magneto from ground when said switch is in the second position to permit said engine to continue to operate when said power take-off switch is closed and said reverse sensing switch detects that said tractor is intended to move in a reverse direction;

and operator presence detector switch for connecting said magneto to ground when said detector switch is not activated by the operator's presence so as to prevent said engine from operating; and an additional switch connected within said control circuit between said operator presence detector switch and said reverse sensing switch and power takeoff switches.

2. An engine control circuit according to claim 1, wherein said additional switch is a diode.

3. An engine control according to claim 2, wherein said diode is selectively removable from said circuit to permit reversible connection to the circuit in accordance with the polarity of firing pulses of said magneto.

4. An engine control circuit according to claim 1, wherein said multi-position switch automatically moves to said third position when said key is released while at the fourth position.

5. An engine control circuit according to claim 2, wherein said multi-position switch automatically moves to said third position when said key is released while at the fourth position.

6. An engine control circuit according to claim 1, wherein said additional switch is selectively removable from said circuit to permit reversible connection to the circuit in accordance with the polarity of firing pulses of said magneto.

7. An engine control circuit according to claim 6, wherein said multi-position switch automatically moves to said third position when said key is released while at the fourth position.

8. An engine control circuit according to claim 7, wherein said additional switch is a diode.

\* \* \* \* \*